US005681104A

United States Patent [19]

Chinniah et al.

[11] Patent Number: 5,681,104

[45] Date of Patent: Oct. 28, 1997

[54] MINI-PROJECTOR BEAM HEADLAMPS

[75] Inventors: Jeyachandrabose Chinniah, Ann Arbor; Mahendra S. Dassanayake, Farmington Hills; Alfred Wasilewski, Northville; Jeffrey A. Erion, Plymouth, all of Mich.

[73] Assignee: Ford Motor Company, Dearborn, Mich.

[21] Appl. No.: 553,909

[22] Filed: Nov. 6, 1995

[51] Int. Cl.$^6$ ........................ B60Q 1/04

[52] U.S. Cl. ........................ 362/61; 362/241; 362/297; 362/307; 362/351

[58] Field of Search ........................ 362/61, 237, 240, 362/241, 247, 248, 297, 298, 307, 346, 351, 311

[56] References Cited

U.S. PATENT DOCUMENTS 3,527,974 9/1970 Cooper .
4,839,553 6/1989 Mellor .
4,868,726 9/1989 Segoshi ........................ 362/351
5,047,903 9/1991 Choji .
5,117,335 5/1992 Yamada .
5,158,350 10/1992 Sato .
5,177,396 1/1993 Gielen et al. .
5,211,465 5/1993 Suzuki .
5,345,371 9/1994 Cunningham et al. .
5,353,204 10/1994 Kawamura .
5,394,310 2/1995 Iwasaki .
5,414,601 5/1995 Davenport et al. .

*Primary Examiner*—Y. My Quach
*Attorney, Agent, or Firm*—Daniel M. Stock

[57] ABSTRACT

Headlamp system for an automotive vehicle has an individual lamp for illuminating a high intensity zone and a spread zone of an image surface. The system includes a first light source having a substantially elliptical reflector for directing light to a spread light zone on an image surface and a second light source having a filament mounted in an axial direction to the length. A second reflector has a generally elliptical shape, a first focus, a second focus and a magnification. The second reflector directs light to a high intensity zone on the image surface. A light shield having a generally planar surface is mounted substantially normal to the longitudinal axis substantially at the second focus. An aspheric lens having an aperture having a width is located between the shield and image surface. The maximum magnification of the filament at the aspheric lens is substantially the width of the aperture.

9 Claims, 3 Drawing Sheets

MINI-PROJECTOR BEAM HEADLAMPS

FIELD OF THE INVENTION

The present invention relates generally to projector beam headlamps. More specifically, the invention relates to a space efficient projector beam arrangement.

BACKGROUND OF THE INVENTION

Projector headlamps typically have a light source, a reflective surface, a light shield for blocking light that causes glare, and a lens. A significant amount of light is lost due to the blocking of the shield. The reflector directs light to the center of the top edge of the light shield for distance illumination. The reflector also directs light to the outer sides of the top edge of the light shield for spreading light. Typically more light is directed to the outer sides of the light shield to reduce the amount of light lost due to the shield.

Several disadvantages are found in present projector beams. One disadvantage of the present projector systems is that about 50 percent of the light from the system is blocked by the shield. Since a significant amount of light is blocked, a relatively high wattage bulb is required to supply the required light output. A high wattage bulb also requires a relatively high heat-resisting package to withstand the heat concentration generated from the bulb. Heat resisting housings are relatively expensive to manufacture.

Another disadvantage of projector beam designs is that because light reflected from the reflector is pushed to each side of the light shield, less light is available for distance illumination, i.e., light in a high intensity region. It is desirable to have distance and spreading areas illuminated as much as possible to have a more desirable beam pattern.

Yet another disadvantage of projector beam headlamps is that projector beam headlamps take a significant amount of space. In automotive designs space is a premium, especially in front of the passenger compartment. The depth of prior projector beams is significant in order to provide all the necessary components of a beam pattern such as an adequate high intensity region and beam spreading.

SUMMARY OF THE INVENTION

The present invention overcomes the disadvantages of the related art by providing a reduced depth headlight design using a relatively lower power-consuming system while increasing light output.

The present invention includes a first light source having a substantially elliptical reflector for directing light to a spread light zone on an image surface and a second light source having a filament mounted in an axial direction to the length. A second reflector has a generally elliptical shape, a first focus, a second focus and a magnification. The second reflector directs light to a high intensity zone on the image surface. A light shield having a generally planar surface is mounted substantially normal to the longitudinal axis substantially at the second focus. An aspheric lens having an aperture and a width is located between the shield and image surface. The magnification of the filament at the aspheric lens is substantially the width of the aperture.

Since the illumination for the high intensity zone and the spreading zone are separated, the heat load generated by them is also separated. Further, an increased light output is obtained using a reduced total power, since a light shield only blocks a portion of the light directed to the high intensity zone. One advantage is that the packaging is less expensive since the power is reduced power and the heat load is distributed. Another advantage is that lower power bulbs generally have longer lives and are thus more inexpensive.

DETAILED DESCRIPTION OF THE PREFERRED EMBODIMENTS

Figure 1:
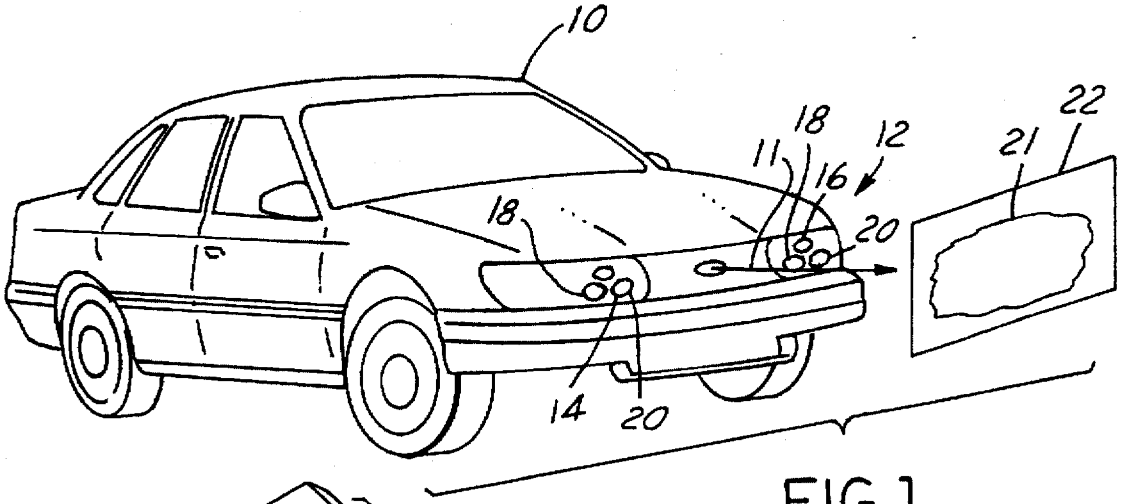
FIG. 1 is an automotive vehicle having a lighting system according to the present invention.

Referring to FIG. 1, an automotive vehicle 10 has a front lighting system 12. Front lighting system 12 has low beam lamps 14 and high beam lamps 16. Low beam lamps 14 are comprised of two types of lamps: a spreading lamp 18 and a high intensity zone lamp 20. High beam lamps 16 are preferably comprised of only one lamp on each side of the vehicle. Low beam lamps 14 and high beam lamps 16 project an image to illuminate an area 21 on an image surface 22. Low beam lamps 14 and high beam lamps 16 may act together to form a complete high beam pattern.

Figure 2:
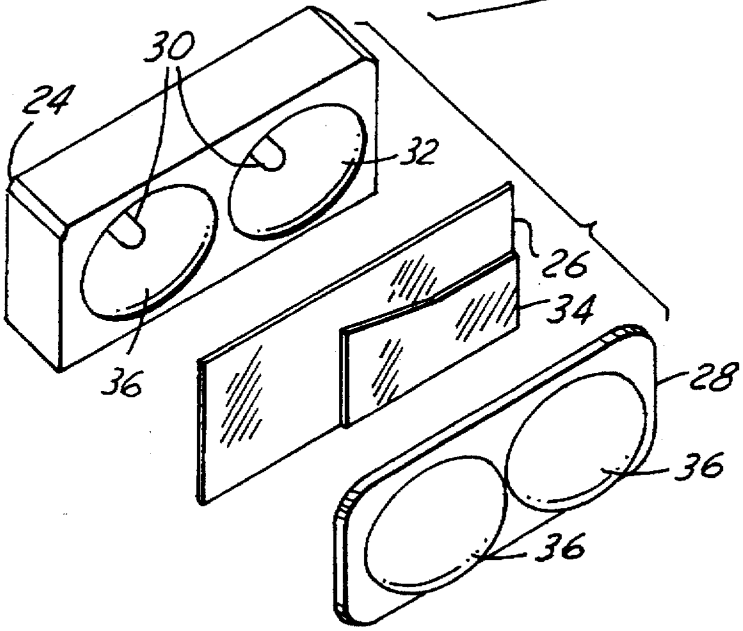
FIG. 2 is an exploded view of low beam headlamps according to the present invention.

Referring now to FIG. 2, a housing 24 contains low beam lamps 14 and may also include high beam lamps (not shown). Because the invention is particularly suited for the generation of a low beam pattern, the high beam lamp is not discussed further. Low beam lamps 14 may be placed in any relationship with respect to the other, i.e., a horizontal, vertical, diagonal or other relationship. Also low beam lamps 14 may be comprised of several high intensity zone lamps 20 or several spreading lamps 18 or several of both to create a particular style.

Housing 24 has a pair of light sources 30, each of which has a reflector 32. Housing 24 is preferably made of a plastic material. Reflector 32 is preferably made of a common reflecting material, such as aluminum. Reflector 32 also preferably has a dichroic coating to permit infrared radiation generated from light sources 30 to pass out of housing 24.

Low beam lamps 14 also have a transparent partition 26 and a lens 28. Partition 26 has a light shield 34. Light shield 34 is an opaque region formed on the surface of partition 26. Partition 26 may be made from a transparent material such as glass. Light shield 34 may be made of an opaque material such as ceramic.

Lens 28 is preferably comprised of two aspheric lenses 36, one for each light source 30. Lens 28 is preferably made of a relatively lower heat resistant material like acrylic.

Figure 3:
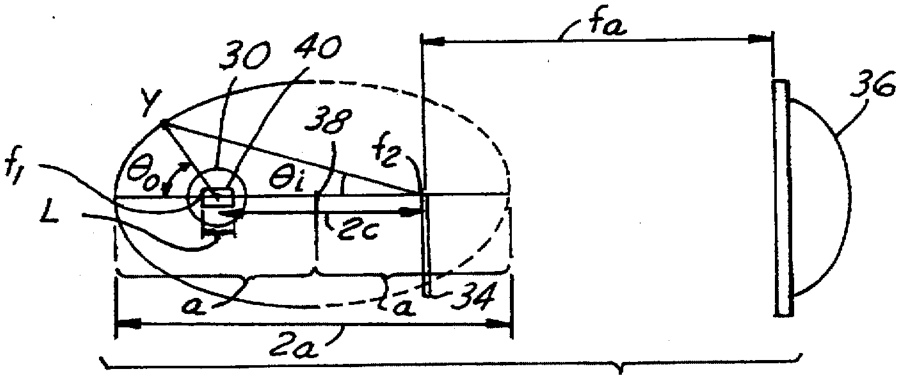
FIG. 3 is a graphical representation of the relationship components of the present invention.

Referring now to FIG. 3, reflector 32 is polyellipsoidal in shape. The polyellipsoid has a first focus f1 and a second focus f2. Point Y is a point on the surface of the polyellipsoid. The polyellipsoid also has a major axis 38 which is substantially parallel to the longitudinal axis of the automotive vehicle. The object angle $\theta_O$ is defined as the angle subtended between the major axis and the point Y with focus f1 as the vertex of the angle. The image angle $\theta_i$, the angle between the major axis and point Y with focus f2 as its vertex. The distance between the two foci, f1 and f2 is defined as the distance to 2C. The length of the ellipse is defined as 2A. The light source 30, as shown in FIG. 2, has a filament 40. The filament 40 preferably has a length l which is also preferably parallel to the longitudinal axis of the automotive vehicle. Magnification m at f2 is defined as the distance between F2 and point Y divided by the distance between f1 and the point Y. Magnification m is a function of the object angle and can be written as:

$$m = \frac{\left(\frac{\alpha}{c} + \cos\theta_o\right)^2 + \sin^2\theta_o}{\left(\frac{\alpha}{c}\right)^2 - 1}$$

The object angle is related to the image angle by the formula:

$$\tan\frac{\theta_i}{2} = \left(\frac{\frac{\alpha}{c} - 1}{\frac{\alpha}{c} + 1}\right)\tan\frac{\theta_o}{2}$$

Light shield 34 is aligned with the focus $f_2$. Aspheric lens 36 has a focus $f_a$. The length of $f_a$ is preferably the distance between the aspheric lens 36 and focus $f_2$. The best glare control for the lamp is obtained with image angle $\theta_i$ of approximately 5° and an A/C ratio of greater than 1 but less than 1.5. The magnification m can be as large as 3 or 4. Therefore, a lamp with a diameter of 40 mm. has a filament length of about 3 mm. and a filament diameter of 1 mm. The length to diameter of the filament is preferably 3:1. Typically, an aspheric lens of the described proportion has a focal length of between 40 and 50 mm. The magnification at the aspheric lens is given by:

$$M = m + \frac{f_o\left(\frac{\alpha}{c} + \cos\theta_o\right)}{c\left(\left(\frac{\alpha}{c}\right)^2 - 1\right)\cos\theta_1}$$

Figure 4A:
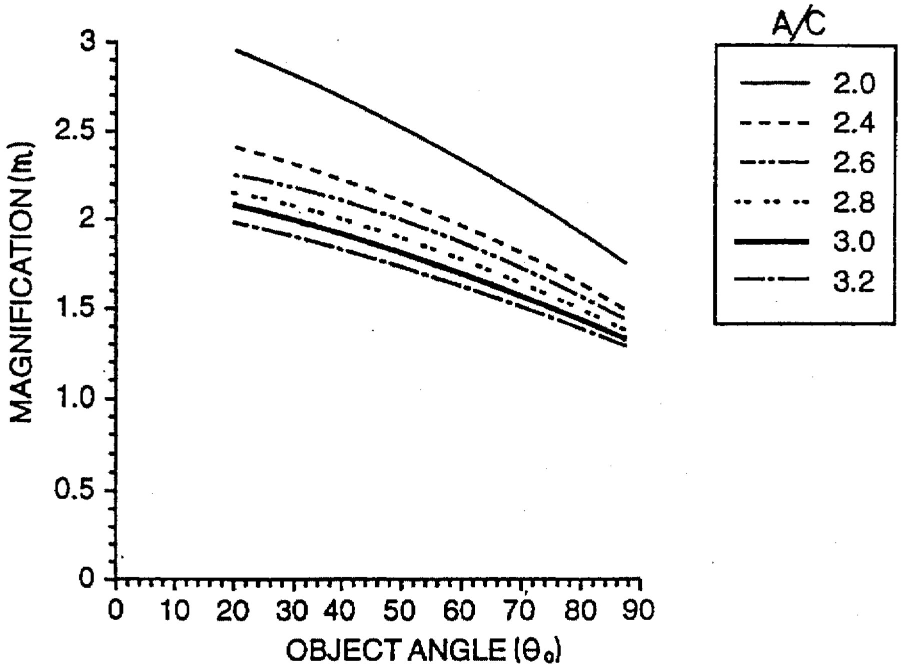
FIG. 4A is a graph of magnification versus object angle for a family of ellipses having different A over C ratios.

Referring now to FIG. 4A, a family of curves is shown where each line corresponds to a respective A to C ratio for a respective ellipse. Magnification is shown as a function of position along the ellipse specified by $\theta_O$. The object angle $\theta_O$ increases, the magnification decreases.

Figure 4B:
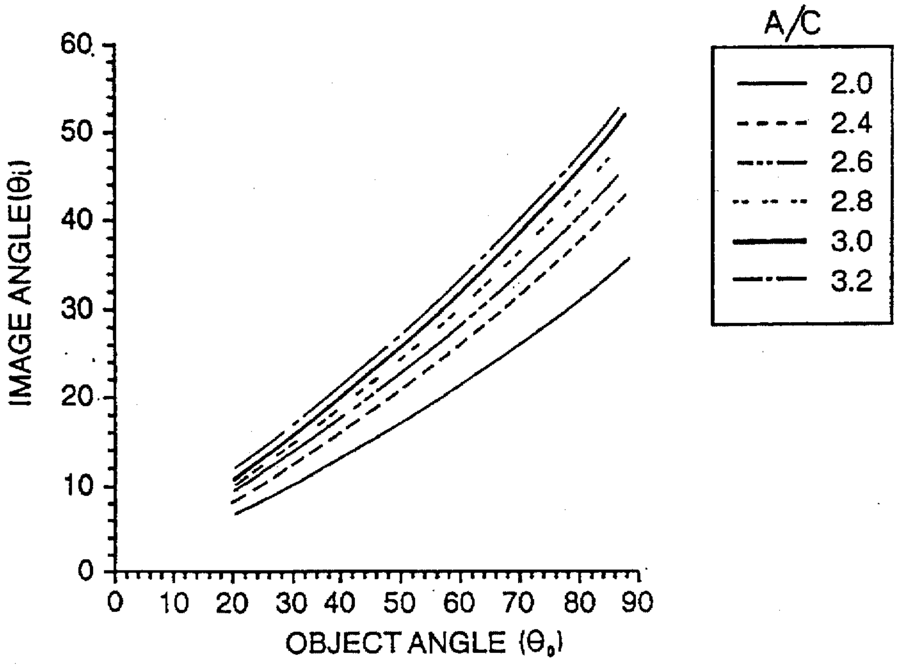
FIG. 4B is a graph of image angle versus object angle for a family of ellipses.

Referring now to FIG. 4B, once the object angle is known, the corresponding image angle can be determined. One of the objects of designing the lighting system is to design magnification at each point on the polyellipsoidal surface so that the magnification of the filament at the aspheric lens is essentially the diameter of the aperture of the aspheric lens.

Figure 5:
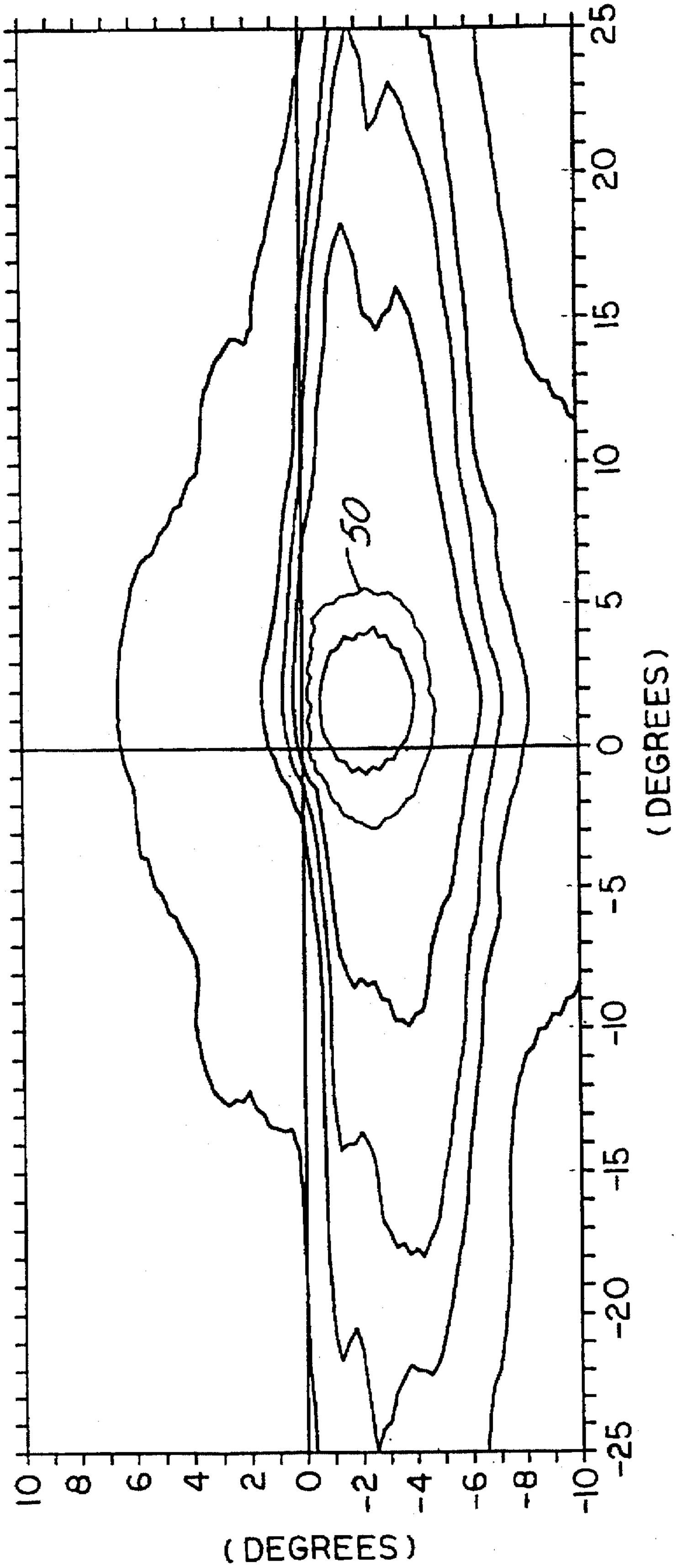
FIG. 5 is an isobar plot of the light output of a lighting system according to the present invention.

Referring now to FIG. 5, an isocmadela plot of light distribution of a low beam lighting system according to the present invention is shown. A high intensity zone 50 is formed from high intensity zone lamps 20, the region outside of the high intensity zone is a spreading zone 52 which is generated by spreading lamp 18. The low beams here are broken into bending and spreading regions to alleviate the drawbacks of prior art. One of the drawbacks is the package depth that, for this invention, is about 80 mm., which compares to 180 mm. in conventional projector beam headlamps. Also, in a conventional projector beam headlamp, a single 55 watt bulb generating 1000 lumens is used to get 500 lumens out. Because of the high heat generated by the bulb more expensive heat resistant materials are used for the projector beam headlamp, such as a glass lens. In the present invention, two 20 watt 400 lumen bulbs are used to obtain a total light output of 600 lumens. Because the heat is distributed between two reflectors, cheaper, less heat resistant materials may be used, such as a plastic lens and a plastic housing. Also, the present invention uses a light shield which only blocks 25% of the total lumens of the two light sources, since only one light source must be shielded. That compares to 50% of the light being shielded in a conventional projector beam headlamp. Another drawback of conventional projector beam headlamps is that in order to provide spreading and hot spot illumination, some hot spot illumination is lost, since small bright images are pushed to the sides of the light shield. Consequently, performance of conventional lamps are compromised due to balancing light toward the high intensity zone and spreading the light. This is alleviated in the present invention, since the two functions are separated. Concentration of the high intensity zone lamp is on the high intensity zone, whereas the spreading lamp concentrates on the area outside the high intensity zone.

Spreading lamp 18 also has a polyellipsoidal shape. This polyellipsoidal shape is designed so that images are projected to the sides of the major axis of the reflector. No light shield is required for the spreading lamp, since glare is not a problem.

Although the preferred embodiment of the present invention has been disclosed, various changes and modifications may be made without departing from the scope of the invention as set forth in the appended claims.

We claim:

1. A headlamp system for an automotive vehicle having a longitudinal axis, comprising:

an image surface;

a first light source;

a first reflector having a substantially elliptical reflector directing light from said first light source to a spread light zone on said image surface;

a second light source having a filament with a length, said length mounted in a parallel direction to said longitudinal axis;

a second reflector having a generally elliptical shape having a first focus, a second focus, and a magnification, said second reflector directing light from said second light source to a high intensity zone on said image surface;

a light shield having a generally planar surface mounted substantially normal to said longitudinal axis substantially at said second focus; and an aspheric lens having an aperture width, wherein said second reflector magnification of light from said second light source filament at said lens is substantially a diameters of the aperture width.

2. A headlamp system as recited in claim 1 further comprising a transparent partition located between said first and second light sources and said lens, a portion of said partition forming said opaque light shield.

3. A headlamp system as recited in claim 1 wherein said first and second reflectors have dichroic coatings.

4. A headlamp system as recited in claim 1 wherein said magnification is less than about 4.

5. A headlamp system for an automotive vehicle having a longitudinal axis, comprising:

an image surface;

a housing;

a first lighting element mounted within said housing, said first lighting element having, a first light source having substantially elliptical reflector directing light to a spread light zone on said image surface; and a second lighting element mounted within said housing, said second lighting element having, a second light source having a filament mounted in an axial direction with respect to said longitudinal axis;

a second reflector mounted within said housing adjacent to said first reflector having a generally elliptical shape having a first focus, a second focus, and a magnification with respect to said second light source filament, said first reflector directing light to a high intensity zone on said image surface;

a light shield having a generally planar surface mounted substantially normal to said longitudinal axis substantially at said second focus; and an aspheric lens having an aperture, wherein said second reflector magnification of said filament at said lens defines a light image substantially equal in size to an opening of said aperture.

6. A headlamp system as recited in claim 5 further comprising a transparent partition located between said first and second light sources and said lens, a portion of said partition forming said opaque light shield.

7. A headlamp system as recited in claim 5 wherein said first and second reflectors have dichroic coatings.

8. A headlamp system as recited in claim 5 wherein said magnification is less than about 4.

9. A headlamp system as recited in claim 5 wherein said housing is comprised of plastic.

* * * * *